United States Patent
Sommerfeld (10) Patent No.: US 12,013,015 B2
(45) Date of Patent: Jun. 18, 2024

(54) ACTUATOR ASSEMBLY

(71) Applicant: Cameron International Corporation, Houston, TX (US)

(72) Inventor: Kyle Sommerfeld, Houston, TX (US)

(73) Assignee: CAMERON INTERNATIONAL CORPORATION, Houston, TX (US)

( * ) Notice: Subject to any disclaimer, the term of this patent is extended or adjusted under 35 U.S.C. 154(b) by 0 days.

(21) Appl. No.: 18/337,609

(22) Filed: Jun. 20, 2023

(65) Prior Publication Data

US 2023/0332675 A1    Oct. 19, 2023

Related U.S. Application Data

(62) Division of application No. 17/457,923, filed on Dec. 7, 2021, now Pat. No. 11,746,862.

(60) Provisional application No. 63/132,280, filed on Dec. 30, 2020.

(51) Int. Cl.
   *F16H 25/20*    (2006.01)
(52) U.S. Cl.
   CPC .................. *F16H 25/2015* (2013.01)
(58) Field of Classification Search
   CPC .. F16H 25/2015; F16H 25/2021; E21B 3/035; E21B 4/04; E21B 1/12; B25D 11/102; B25D 11/10
   See application file for complete search history.

(56) References Cited

U.S. PATENT DOCUMENTS

| | | | |
|---|---|---|---|
| 1,196,052 A | 8/1916 | Waugh | |
| 2,417,434 A | 3/1947 | Mead | |
| 3,133,602 A | 5/1964 | Charles | |
| 3,149,681 A | 9/1964 | Drew | |
| 3,268,014 A | 8/1966 | Drew | |
| 4,858,481 A * | 8/1989 | Abraham | H02K 11/25 318/473 |
| 5,255,882 A | 10/1993 | Schroppel | |
| 6,679,663 B2 | 1/2004 | DiStasio et al. | |
| 8,784,027 B2 | 7/2014 | Hess | |
| 9,103,422 B2 | 8/2015 | Wingett | |
| 10,907,712 B2 | 2/2021 | Bastide | |
| 11,078,996 B2 | 8/2021 | Momose | |
| 2003/0084736 A1 | 5/2003 | Darby | |
| 2021/0293312 A1 | 9/2021 | Hawksworth | |
| 2022/0205518 A1 | 6/2022 | Sommerfeld | |

* cited by examiner

*Primary Examiner* — Gregory Robert Weber
(74) *Attorney, Agent, or Firm* — Matthew Goode (57) ABSTRACT

An actuator assembly includes a threaded shaft, a threaded nut that is threadably coupled to the threaded shaft, an annular ratchet positioned about the threaded shaft and comprising one or more tracks, and a pin that extends from the threaded shaft and into the one or more tracks. The threaded nut may include a first circumferentially-facing surface, the annular ratchet may include a second circumferentially-facing surface, and the first and second circumferentially-facing surfaces are configured to contact one another to enable the threaded nut to block rotation of the annular ratchet with the threaded shaft. The actuator assembly may enable the threaded nut to move to a limit position and hold full motor torque, but also to break free from the limit position with relatively low torque (e.g., less than the full motor torque; as compared to actuator systems that are devoid of certain features of the actuator assembly).

15 Claims, 7 Drawing Sheets

ACTUATOR ASSEMBLY

CROSS-REFERENCE TO RELATED APPLICATION

This application is a Divisional of U.S. Non-Provisional application Ser. No. 17/457,923, filed on Dec. 7, 2021, which claims priority to and the benefit of U.S. Provisional Application No. 63/132,280, entitled "ACTUATOR ASSEMBLY" and filed Dec. 30, 2020, which are incorporated by reference herein in their entirety for all purposes.

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Natural resources, such as oil and gas, are used as fuel to power vehicles, heat homes, and generate electricity, in addition to various other uses. Once a desired resource is discovered below the surface of the earth, mineral extraction systems are often employed to access and extract the resource. These mineral extraction systems may be located onshore or offshore depending on the location of a desired resource. Further, such mineral extraction systems generally include a wellhead mounted above a wellbore through which the resource is extracted. A Christmas tree mounted above the wellhead may include a wide variety of components, such as valves, spools, and fittings that facilitate extraction, injection, and other operations. For example, an actuator may actuate a valve of the Christmas tree to adjust the valve between an open position and a closed position to enable or to block fluid flow across the valve.

SUMMARY

This summary is provided to introduce a selection of concepts that are further described below in the detailed description. This summary is not intended to identify key or essential features of the claimed subject matter, nor is it intended to be used as an aid in determining or limiting the scope of the claimed subject matter as set forth in the claims.

In one embodiment, an actuator assembly includes a threaded shaft, a threaded nut that is threadably coupled to the threaded shaft, an annular ratchet positioned about the threaded shaft and comprising one or more tracks, and a pin that extends from the threaded shaft and into the one or more tracks.

In one embodiment, an actuator assembly includes an assembly housing and a threaded shaft configured to rotate within the assembly housing. The actuator assembly also includes a threaded nut threadably coupled to the threaded shaft and engaged with the assembly housing to block rotation of the threaded nut within the assembly housing. The actuator assembly further includes an annular ratchet positioned about the threaded shaft, wherein the annular ratchet is configured to engage the threaded nut during an end of an actuation process to block further rotation of the threaded shaft.

In one embodiment, a method of operating an actuator assembly includes rotating a threaded shaft and an annular ratchet in a first rotational direction. The method also includes moving a threaded nut along the threaded shaft in a first direction along a longitudinal axis toward the annular ratchet via the rotating of the threaded shaft and the annular ratchet in the first rotational direction. The method further includes blocking the rotating of the annular ratchet in the first rotational direction via contact between the annular ratchet and the threaded nut. The method further includes moving the annular ratchet along the threaded shaft in a second direction along the longitudinal axis toward the threaded nut via the rotating of the threaded shaft in the first rotational direction while blocking the rotating of the annular ratchet in the first rotational direction via the contact between the annular ratchet and the threaded nut.

BRIEF DESCRIPTION OF THE DRAWINGS

Various features, aspects, and advantages of the present disclosure will become better understood when the following detailed description is read with reference to the accompanying figures in which like characters represent like parts throughout the figures, wherein.

DETAILED DESCRIPTION OF SPECIFIC EMBODIMENTS

One or more specific embodiments of the present disclosure will be described below. These described embodiments are only exemplary of the present disclosure. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
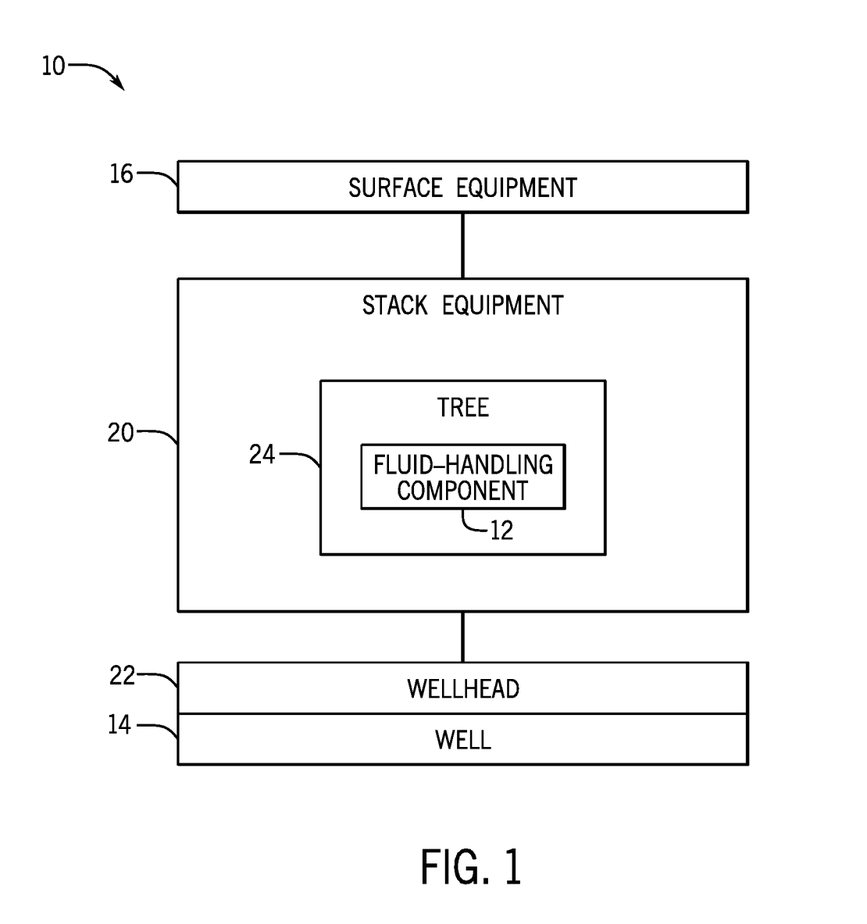
FIG. 1 is a block diagram of a mineral extraction system having a fluid-handling component, in accordance with an embodiment of the present disclosure.

FIG. 1 illustrates an embodiment of a mineral extraction system 10 (e.g., drilling system and/or production system) that includes a fluid-handling component 12 (e.g., a gate valve, choke valve, ball valve, check valve, pressure-regulating valve). The mineral extraction system 10 may be configured to facilitate the extraction of a resource, such as oil or natural gas, from a well 14. As shown, the system 10 includes a variety of equipment, such as surface equipment 16 and stack equipment 20, for extracting the resource from the well 14 via a wellhead 22.

The surface equipment 16 may include a variety of devices and systems, such as pumps, conduits, valves, power supplies, cable and hose reels, control units, a diverter, a gimbal, a spider, and the like. As shown, the stack equipment 20 includes a tree 24, also commonly referred to as a "Christmas tree." The tree 24 may include one or more fluid-handling components 12 that control the flow of the resource out of the well 14 and upward toward the surface equipment 16 and/or that control the flow of injected fluids into the well 14. For example, the tree 24 may include various valves, conduits, flow meters, sensors, and so forth.

While the fluid-handling component 12 is shown within the tree 24 in FIG. 1, it should be understood that the fluid-handling component 12 disclosed herein may be used in any portion of the system 10, such as the surface equipment 16, the stack equipment 20, the wellhead 22, and/or subsea equipment, for example. Furthermore, while FIG. 1 illustrates a land-based system, it should be understood that the fluid-handling component 12 may be part of an offshore system or a pipeline system.

Figure 2:
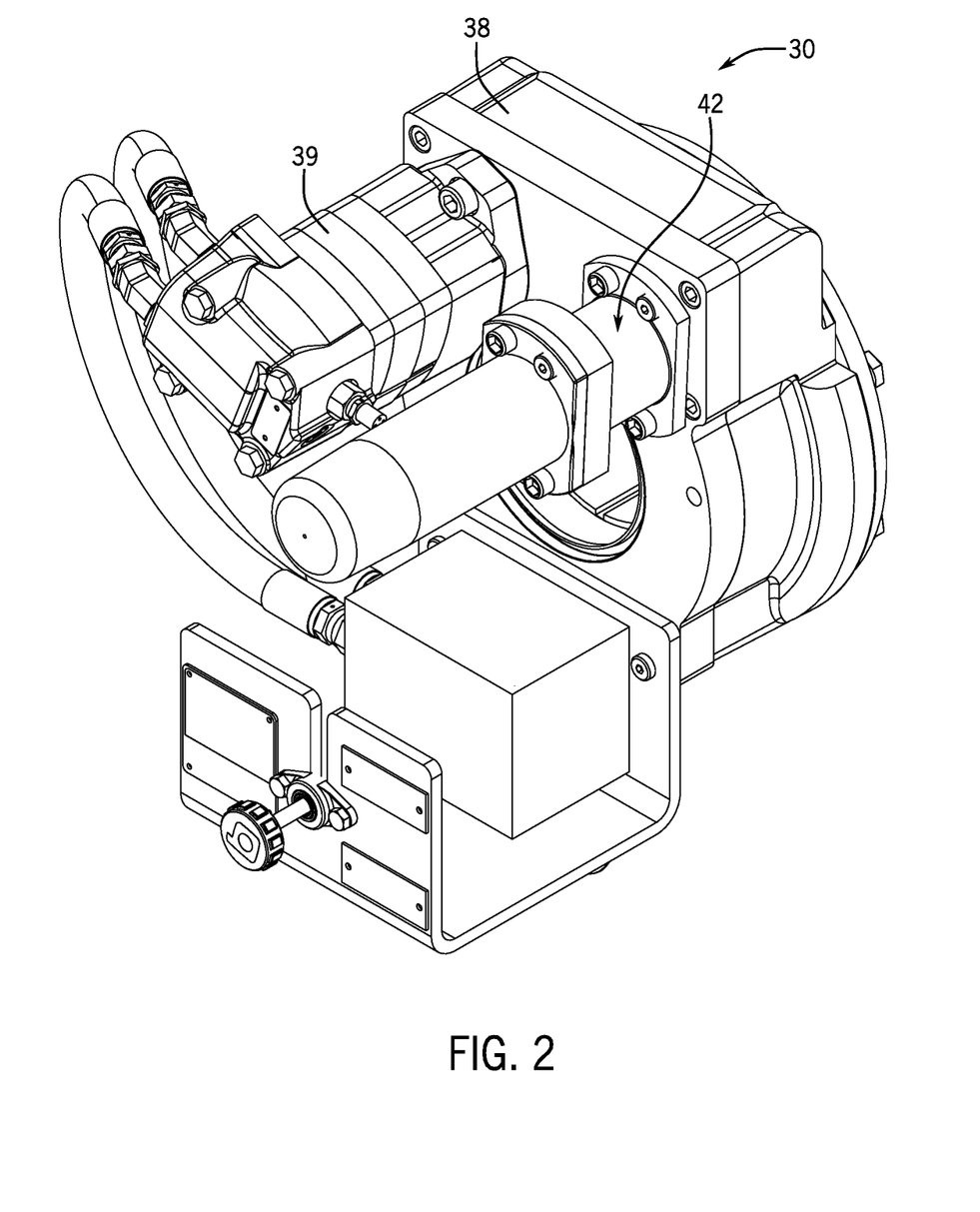
FIG. 2 is a perspective view of an actuator system that may be used to actuate the fluid-handling component of FIG. 1, in accordance with an embodiment of the present disclosure.
Figure 3:
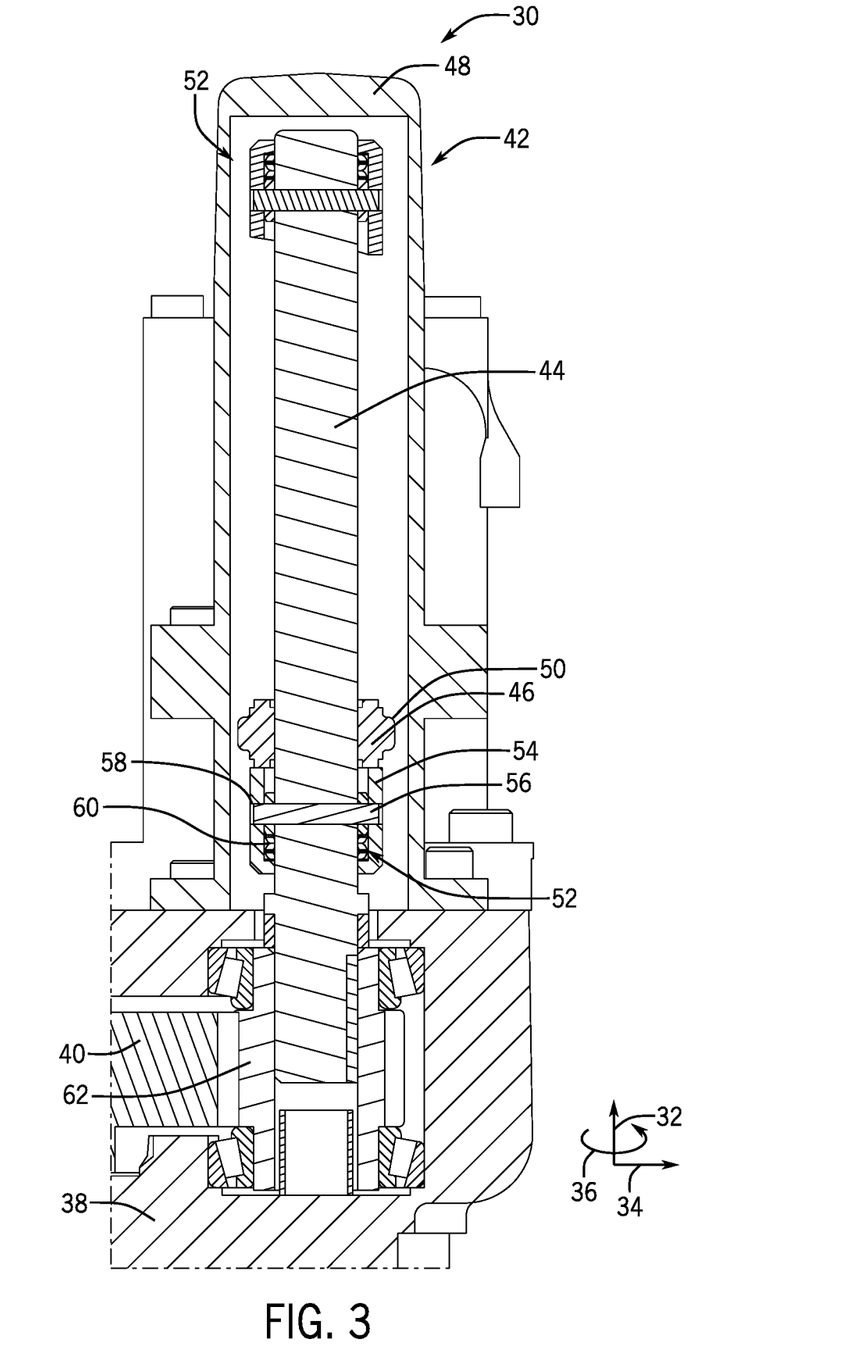
FIG. 3 is a cross-sectional side view of a portion of the actuator system of FIG. 2, in accordance with an embodiment of the present disclosure.

FIG. 2 is a perspective view of an embodiment of an actuator system 30 (e.g., hydraulic actuator system) that may be used to actuate the fluid-handling component 12 of FIG. 1, and FIG. 3 is a cross-sectional side view of a portion of the actuator system 30 of FIG. 2. With reference to FIG. 3 and to facilitate discussion, the actuator system 30 and its components may be described with reference to a longitudinal axis or direction 32, a radial axis or direction 34, and/or a circumferential axis or direction 36.

As shown, the actuator system 30 may include a housing 38 that surrounds (e.g., houses) one or more rotatable rings 40 (e.g., gears). The actuator system 30 may also include a motor assembly 39 (e.g., with an electric or hydraulic motor) and an actuator assembly 42 (e.g., stop assembly). The motor assembly 39 is configured to drive rotation of the one or more rotatable rings 40 to thereby actuate the fluid-handling component 12 of FIG. 1, such as to open or to close a gate of a gate valve. The actuator assembly 42 may engage the one or more rotatable rings 40 and may operate to stop or to limit the rotation of the rotatable ring 40, as discussed in more detail herein. It should be appreciated that the motor assembly 39 and the one or more rotatable rings 40 are merely examples of components that may be used as part of the actuator system 30. For example, a handwheel (e.g., to turn/actuate via hand; manually) may be used instead of the motor assembly 39 with or without torque multiplication (e.g., with or without the one or more rotatable rings 40). Furthermore, chains, belts, and/or direct coupling between the threaded fastener 44 and the fluid-handling component may be used instead of the one or more rotatable rings 40.

The actuator assembly 42 may include a threaded shaft 44, as well as a threaded nut 46 (e.g., annular nut; traveling nut) that is configured to move up and down the threaded shaft 44 along the longitudinal axis 32 (e.g., relative to the threaded shaft 44 along the longitudinal axis 32). The threaded nut 46 may move up and down the threaded shaft 44 by exerting a rotational force on the threaded shaft 44 while also blocking the threaded nut 46 from rotating with the threaded shaft 44. For example, the actuator assembly 42 may include an assembly housing 48 that interfaces with one or more radially-extending tabs 50 of the threaded nut 46 to block the threaded nut 46 from rotating with the threaded shaft 44 and to thereby enable rotation of the threaded shaft 44 to drive the threaded nut 46 to move up and down the threaded shaft 44 along the longitudinal axis 32. However, it should be appreciated that in certain operations or configurations of the actuator assembly 42, the threaded nut 46 may move up and down the threaded shaft 44 by exerting a rotational force on the threaded nut 46 to drive the threaded nut 46 to rotate about and to travel up and down threads of the threaded shaft 44.

The actuator assembly 42 also includes one or more stop assemblies 52 (e.g., an upper stop assembly and a lower stop assembly). Each stop assembly 52 includes a ratchet 54 (e.g., annular sleeve; cam), a pin 56 (e.g., follower) that extends through tracks 58 (e.g., circumferentially-spaced; angled openings, slots, or grooves) in the ratchet 54, and/or a biasing assembly 60 (e.g., annular spring assembly; leaf springs) that is configured to bias the ratchet 54 away from the threaded nut 46. It should be appreciated that the biasing assembly 60 may have any suitable form, such as a leaf spring (e.g., axial spring) or a clock spring (e.g., rotational spring), that is configured to bias the ratchet 54 as described herein.

As shown, the threaded shaft 44 is coupled to (e.g., non-rotatably coupled; rotates with) a stop ring 62 (e.g., gear), and the stop ring 62 is configured to engage (e.g., via teeth; rotates with) the one or more rotatable rings 40. Thus, the rotation of the one or more rotatable rings 40 causes rotation of the stop ring 62 and the threaded shaft 44, which causes the threaded nut 46 to move up and down the threaded shaft 44 along the longitudinal axis 32 between the stop assemblies 52. When the threaded nut 46 engages with one of the stop assemblies 52, the threaded nut 46 blocks further rotation of the threaded shaft 44, as well as the stop ring 62 and the one or more rotatable rings 40. In this way, the arrangement of components of the actuator assembly 42, as well as the engagement between the stop ring 62 of the actuator assembly 42 and the one or more rotatable rings 40, enable the actuator assembly 42 to stop or to limit the rotation of the one or more rotatable rings 40.

Advantageously, the actuator assembly 42 may provide a non-jamming operation. For example, the actuator assembly 42 may enable the threaded nut 46 to move to a limit, or bottom-out, position and hold full motor torque, but also to break free from the limit position with relatively low torque (e.g., less than the full motor torque; as compared to actuator systems that are devoid of certain features of the actuator assembly 42).

Figure 4:
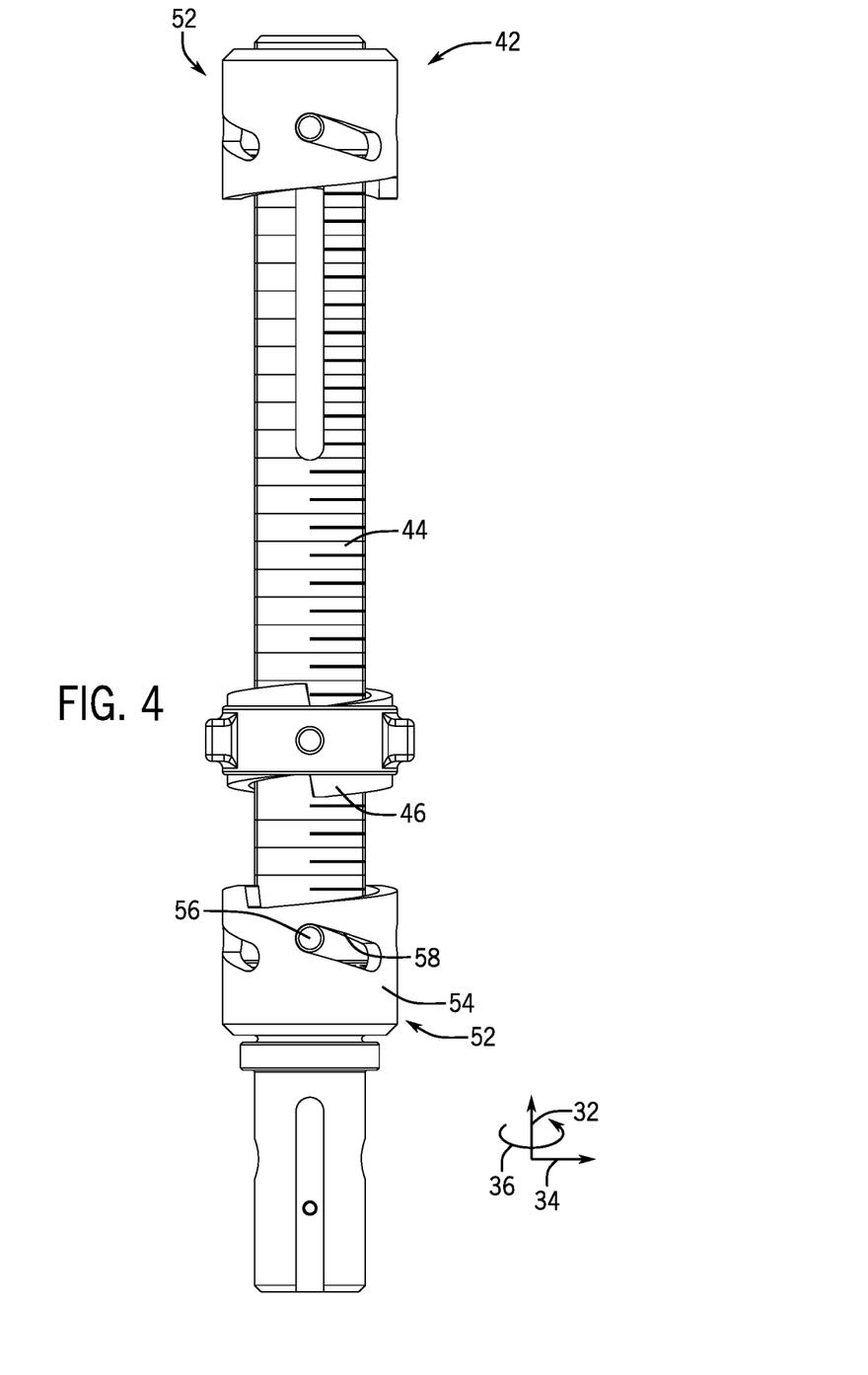
FIG. 4 is a side view of an actuator assembly that may be used in the actuator system of FIG. 2, in accordance with an embodiment of the present disclosure.

FIGS. 4-9 are various views of an embodiment of the actuator assembly 42. The assembly housing 48 that is shown in FIGS. 2 and 3 is removed in FIGS. 4-9 for image clarity. In particular, FIG. 4 is a side view of the actuator assembly 42. The actuator assembly 42 includes the threaded shaft 44, as well as the threaded nut 46 that is configured to move up and down the threaded shaft 44 along the longitudinal axis 32. A threaded interface between the threaded shaft 44 and the threaded nut 46 enable the threaded nut 46 to move down the threaded shaft 44 along the longitudinal axis 32 via rotation of the threaded shaft 44 in the circumferential direction 36, and the threaded interface between the threaded shaft 44 and the threaded nut 46 enable the threaded nut 46 to move up the threaded shaft 44 along the longitudinal axis 32 via rotation of the threaded shaft 44 in a direction opposite to the circumferential direction 36.

The actuator assembly 42 also includes the one or more stop assemblies 52 (e.g., an upper stop assembly and a lower stop assembly). Each stop assembly 52 includes the ratchet 54 and the pin 56 that extends through the tracks 58 in the ratchet 54. Features and operational characteristics of one stop assembly 52 (e.g., the lower stop assembly) are illustrated and described in detail herein to facilitate discussion; however, it should be appreciated that another stop assembly 52 (e.g., the upper stop assembly) may include the same features and operational characteristics.

Figure 5:
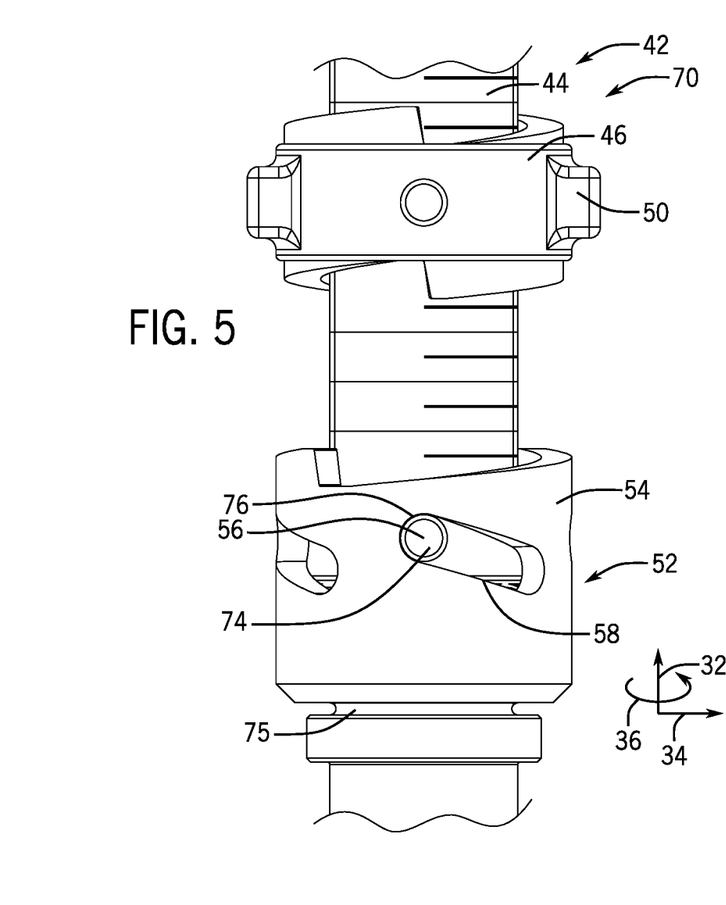
FIG. 5 is a side view of a portion of the actuator assembly of FIG. 4, wherein the actuator assembly is in a first configuration, in accordance with an embodiment of the present disclosure.
Figure 6:
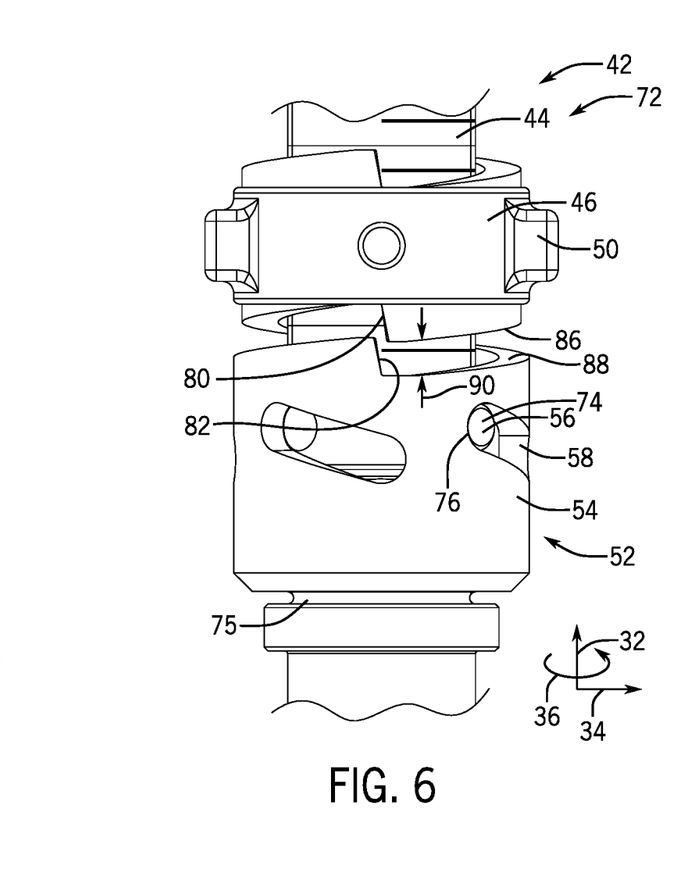
FIG. 6 is a perspective side view of the portion of the actuator assembly of FIG. 4, wherein the actuator assembly is in a second configuration, in accordance with an embodiment of the present disclosure.

With this in mind, FIGS. 5-8 illustrate an embodiment of the actuator assembly 42 in different configurations (e.g., as the threaded nut 46 moves between a separated position in which the threaded nut 46 does not contact the ratchet 54 and the limit position in which the threaded nut 46 has reached an end of travel along the threaded shaft 44). In particular, FIG. 5 is a side view of a portion of the actuator assembly 42, wherein the actuator assembly 42 is in a first configuration 70 in which the threaded nut 46 is in the separated position. FIG. 6 is a perspective side view of the portion of the actuator assembly 42, wherein the actuator assembly 42 is in a second configuration 72 in which the threaded nut 46 is about to make initial contact with the ratchet 54.

To move from the first configuration 70 to the second configuration 72, the threaded nut 46 may move toward the ratchet 54. For example, the threaded shaft 44 may be driven to rotate in the circumferential direction 36 (e.g., via engagement with the one or more rotatable rings 40 in FIG. 3). The rotation of the threaded shaft 44 causes the threaded nut 46 to move toward the ratchet 54 (e.g., without rotation in the circumferential direction 36) due to the threaded interface between the threaded shaft 44 and the threaded nut 46, as well as engagement between the one or more tabs 50 and the assembly housing 48 of FIG. 3.

The ratchet 54, including the pin 56 that is positioned in the track 58, rotate with the threaded shaft 44 while the threaded nut 46 is in the separated position (e.g., while the ratchet 54 and the threaded nut 46 do not contact one another). The ratchet 54, including the pin 56 that is positioned in the track 58, may rotate with the threaded shaft 44 due to friction between the components, for example. In both FIGS. 5 and 6, the ratchet 54 is in a first ratchet position (e.g., initial position) relative to the threaded shaft 44, and the ratchet 54 remains in the first ratchet position proximate to or against a first end 75 of the threaded shaft 44 and as the threaded nut 46 moves toward the ratchet 54. Additionally, a first end portion 74 of the pin 56 is in a first pin position proximate to or against a first end portion 76 of the track 58, and the first end portion 74 of the pin 56 remains in the first pin position proximate to or against the first end portion 76 of the track 58 as the ratchet 54 rotates with the threaded shaft 44 and as the threaded nut 46 moves toward the ratchet 54.

As shown in FIG. 6, the initial contact between the threaded nut 46 and the ratchet 54 occurs between a circumferentially-facing surface 80 of the threaded nut 46 and a circumferentially-facing surface 82 of the ratchet 54. The circumferentially-facing surfaces 80, 82 may extend along the longitudinal axis 32 and may be oppositely inclined along the longitudinal axis 32. However, it should be appreciated that one or both of the circumferentially-facing surfaces 80, 82 may be aligned with and parallel to the longitudinal axis 32. At the initial contact, a longitudinally-facing surface 86 of the threaded nut 46 and a longitudinally-facing surface 88 of the ratchet 54 do not contact one another and are separated from one another by a longitudinally-extending gap 90. Upon the initial contact between the threaded nut 46 and the ratchet 54, the ratchet 54 is blocked from further rotation with the threaded shaft 44.

Figure 7:
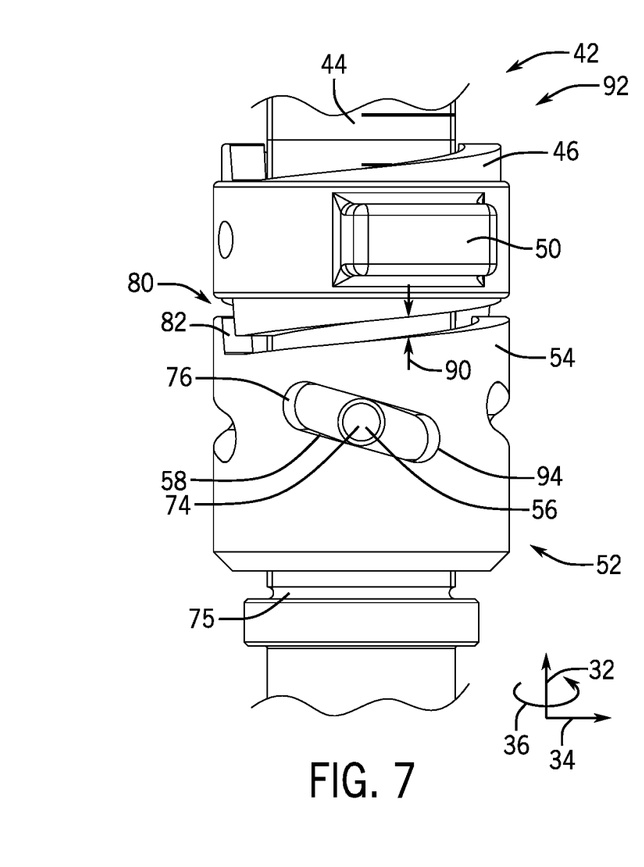
FIG. 7 is a side view of the portion of the actuator assembly of FIG. 4, wherein the actuator assembly is in a third configuration, in accordance with an embodiment of the present disclosure.
Figure 8:
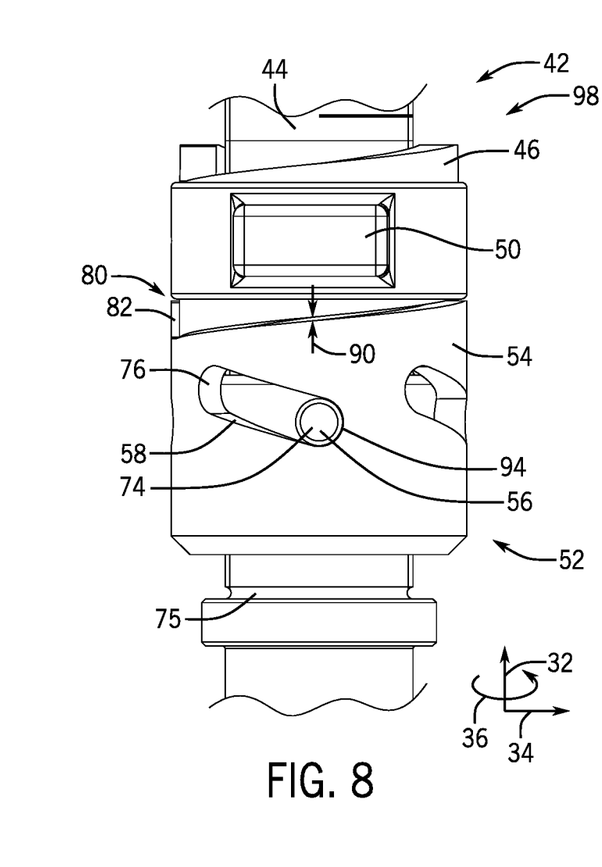
FIG. 8 is a side view of the portion of the actuator assembly of FIG. 4, wherein the actuator assembly is in a fourth configuration, in accordance with an embodiment of the present disclosure.

FIGS. 7 and 8 are rotated to varying degrees relative to FIGS. 5 and 6 in order to more clearly illustrate movement of the pin 56 relative to the track 58. However, it should be appreciated that the threaded nut 46 and the ratchet 54 do not rotate with the threaded shaft 44 or relative to the assembly housing 48 of FIG. 3 during a remainder of an actuation process following the initial contact between the threaded nut 46 and the ratchet 54 (e.g., the threaded nut 46 is blocked from rotating via the one or more tabs 50, and the ratchet 54 is blocked from rotating via the threaded nut 46). As shown in FIG. 7, further rotation of the threaded shaft 44 drives the actuator assembly 42 to a third configuration 92 in which more of the circumferentially-facing surfaces 80, 82 contact one another (e.g., greater overlap along the longitudinal axis 32). In particular, further rotation of the threaded shaft 44 while the threaded nut 46 engages and blocks the ratchet 54 from rotating with the threaded shaft 44 causes the first end portion 74 of the pin 56 to move to a second pin position between the first end portion 76 of the track 58 and a second end portion 94 of the track 58. Because the first end portion 76 of the track 58 is at a different position (e.g., above; the track 58 is oriented at an angle) along the longitudinal axis 32 than the second end portion 94 of the track 58, the rotation of the threaded shaft 44 and the pin 56 in the circumferential direction 36 also drives the ratchet 54 along the longitudinal axis 32 and toward the threaded nut 46. Thus, the longitudinally-extending gap 90 decreases and overlap between the circumferentially-facing surfaces 80, 82 along the longitudinal axis 32 increases. The ratchet 54 may be considered to be in a second ratchet position (e.g., intermediate position) that is further from the first end 75 of the threaded shaft 44, as compared to the first ratchet position in FIGS. 5 and 6.

As shown in FIG. 8, further rotation of the threaded shaft 44 drives the actuator assembly 42 to a fourth configuration 98 in which the threaded nut 46 is in the limit position (e.g., along the longitudinal axis 32). In particular, further rotation of the threaded shaft 44 while the threaded nut 46 engages and blocks the ratchet 54 from rotating with the threaded shaft 44 causes the first end portion 74 of the pin 56 to move to a third pin position proximate to or against the second end portion 94 of the track 58. As noted above, because the first end portion 76 of the track 58 is at the different position (e.g., above; the track 58 is oriented at an angle) along the longitudinal axis 32 than the second end portion 94 of the track 58, the rotation of the ratchet 54 in the circumferential direction 36 also drives the ratchet 54 along the longitudinal axis 32 and toward the threaded nut 46. Thus, the longitudinally-extending gap 90 decreases and overlap between the circumferentially-facing surfaces 80, 82 along the longitudinal axis 32 increases. The ratchet 54 may be considered to be in a third ratchet position (e.g., final position) that is further from the first end 75 of the threaded shaft 44, as compared to the second ratchet position in FIG. 7. In the fourth configuration 98, while the pin 56 contacts the second end portion 94 of the track 58, the threaded shaft 44 is blocked from further rotation in the circumferential direction 36 because torque is transferred from the threaded shaft 44, through the pin 56, through the ratchet 54, through the threaded nut 46, and through the protrusions 50 of the threaded nut 46 to the assembly housing.

In some embodiments, even in the fourth configuration 98, the longitudinally-extending gap 90 is present between the longitudinally-facing surfaces 86, 88. Furthermore, the longitudinally-facing surfaces 86, 88 may be oppositely inclined in the circumferential direction 36. Such a configuration may facilitate the break out from the limit position with relatively low torque (e.g., less than the full motor torque; as compared to actuator systems that are devoid of these features of the actuator assembly 42). For example, a portion of the longitudinally-facing surface 86 near the circumferentially-facing surface 80 may briefly contact and drive the longitudinally-facing surface 88 during an initial portion of the break out from the limit position (e.g., as the threaded shaft 44 is rotated in the direction opposite the circumferential direction 36). However, it should be appreciated that one or both of the longitudinally-facing surfaces 86, 88 may be perpendicular to the longitudinal axis 32. As noted above, the actuator assembly 42 may include the biasing assembly 60 (FIG. 3) that biases the ratchet 54 into the first ratchet position of FIG. 5, and the rotation of the threaded shaft 44 may overcome biasing forces of the biasing assembly 60 (FIG. 3) to reach the third configuration 92 of FIG. 7 and the fourth configuration 98 of FIG. 8. The biasing assembly 60 also facilitates the break out from the limit position with relatively low torque (e.g., less than the full motor torque; as compared to actuator systems that are devoid of the biasing assembly 60).

Figure 9:
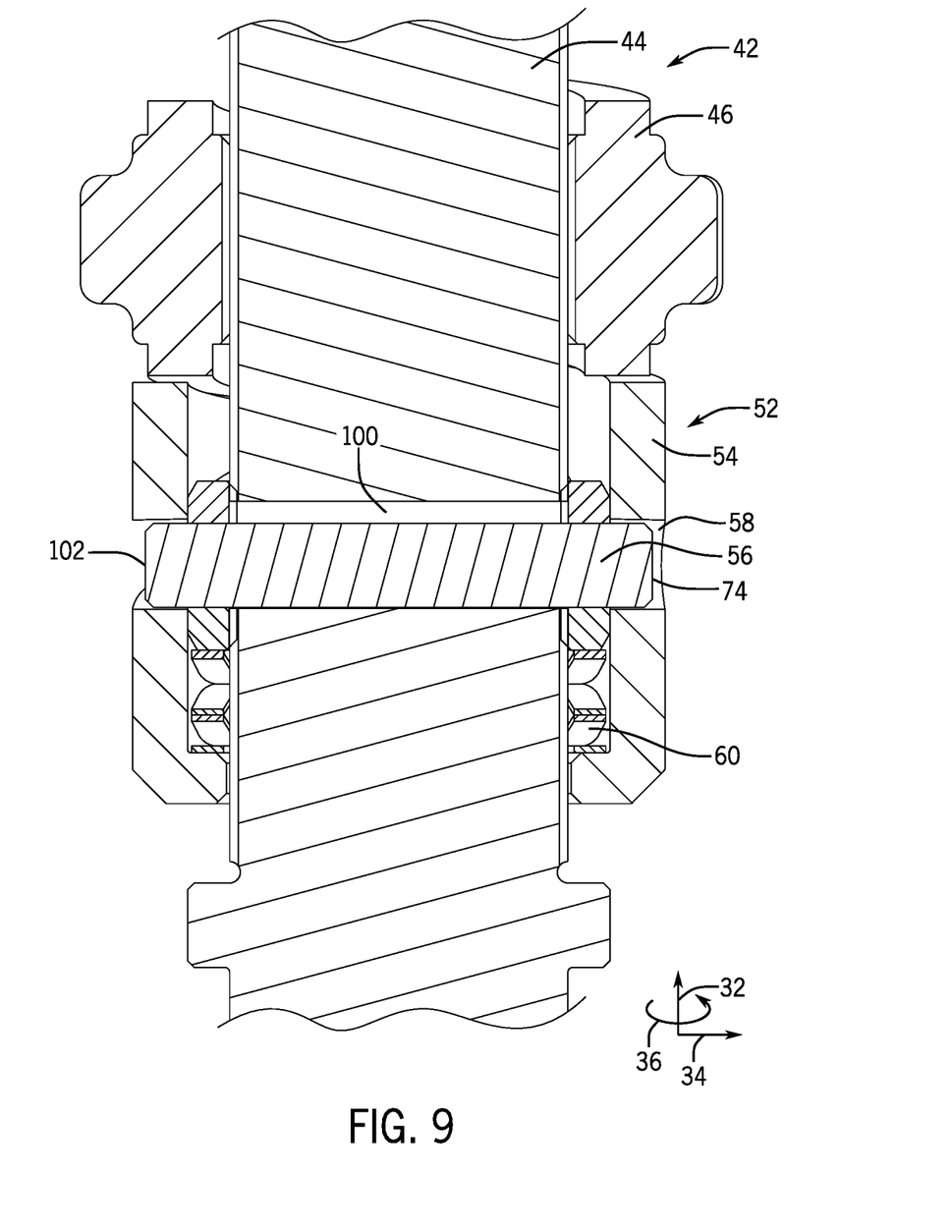
FIG. 9 is a cross-sectional side view of the portion of the actuator assembly of FIG. 4, in accordance with an embodiment of the present disclosure.

FIG. 9 is a cross-sectional side view of an embodiment of the portion of the actuator assembly 42. As shown, the actuator assembly 42 includes the threaded shaft 44 and the threaded nut 46. The actuator assembly 42 also includes the stop assembly 52, which includes the ratchet 54 and the pin 56. As shown, the pin 56 extends through a channel 100 (e.g., through hole) formed in the threaded shaft 44. The pin 56 may be in a fixed position relative to the threaded shaft 44. This configuration enables the first end portion 74 of the pin 56 to extend through one of the tracks 58 of the ratchet 54, and a second end portion 102 of the pin 56 to extend through another one of the tracks 58 of the ratchet 54 (e.g., on opposite sides of the ratchet 54). However, it should be appreciated that the pin 56 may not extend through the threaded shaft 44 and into oppositely-positioned tracks 58 of the ratchet 54. Instead, the pin 56 may extend only partially into the threaded shaft 44 and/or otherwise extend on one side of the threaded shaft 44 into one track 58 in the ratchet 54. In some cases, the pin 56 may be considered to be part of the threaded shaft 44 and/or may be integrally formed with the threaded shaft 44.

Furthermore, any number of pins 56 (e.g., 1, 2, 3, 4, or more) may be utilized to extend into any number of tracks 58 of the ratchet 54. For example, two pins may extend through the threaded shaft 44 and may be spaced apart along the longitudinal axis 32 to extend into two sets of oppositely-positioned tracks 58 that are also spaced apart along the longitudinal axis 32 (e.g., a first set of oppositely-positioned tracks is at a first axial location along the longitudinal axis 32 and a second set of oppositely-positioned tracks is at a second axial location along the longitudinal axis 32). Similarly, the pin 56 may have a cross-shape that has four ends that engage four tracks 58, or the pin 56 may have another shape with another number of ends (e.g., 3, 5, 6, or more) that engage a corresponding number of tracks 58.

In some embodiments, the number of tracks 58 may be greater than the number of pins 56 (or greater than the number of ends of pins 56). For example, the ratchet 54 may include four tracks 58 (e.g., two sets of oppositely-positioned tracks), but only two of the four tracks 58 may be engaged by the pin(s) 56. This may enable adjustment and/or change to the tolerance (e.g., adjustment to when the threaded nut 46 and the ratchet 54 come to a stop). In some such cases, the tracks 58 may have different characteristics (e.g., different end positions, different lengths, different angles relative to the longitudinal axis 32) to enable a wide variety of adjustment and/or change to the tolerance as desired for a particular application. It should also be appreciated that another mechanism (e.g., screw, protrusion, integrated tab; in addition to or as an alternative to the pin(s) 56) may be utilized to transfer load between the ratchet 54 and the threaded shaft 44. The biasing assembly 60 may be positioned between the ratchet 54 and the pin 56 to bias the ratchet 54 away from the threaded nut 46.

As noted herein, the actuator assembly 42 may provide a non-jamming operation. For example, the actuator assembly 42 may enable the threaded nut 46 to move to the limit position and hold full motor torque, but also to break free from the limit position with relatively low torque (e.g., less than the full motor torque; as compared to actuator systems that are devoid of certain features of the actuator assembly 42). The circumferentially-facing surfaces 80, 82 may be the only contact between the threaded nut 46 and the ratchet 54 in the limit position, which may facilitate the non-jamming operation. Furthermore, the circumferentially-facing surface 80, 82 may be oppositely inclined and/or the longitudinally-facing surfaces 86, 88 may be oppositely inclined, which may facilitate the non-jamming operation. Other features, such as the biasing assembly 60, may further contribute to the non-jamming operation.

The actuator assembly 42 may be used in any of a variety of systems, such as the mineral extraction system 10 of FIG. 1. For example, the actuator assembly 42 may facilitate efficient, non-jamming operation of any of a variety of fluid-handling components, such as the fluid-handling component 12 of FIG. 1.

While the disclosure may be susceptible to various modifications and alternative forms, specific embodiments have been shown by way of example in the drawings and have been described in detail herein. However, it should be understood that the disclosure is not intended to be limited to the particular forms disclosed. Rather, the disclosure is to cover all modifications, equivalents, and alternatives falling within the spirit and scope of the disclosure as defined by the following appended claims.

Finally, the techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A method of operating an actuator assembly, the method comprising:
   rotating a threaded shaft and an annular ratchet in a first rotational direction;
   moving a threaded nut along the threaded shaft in a first direction along a longitudinal axis toward the annular ratchet via the rotating of the threaded shaft and the annular ratchet in the first rotational direction;
   blocking the rotating of the annular ratchet in the first rotational direction via contact between the annular ratchet and the threaded nut; and
   moving the annular ratchet along the threaded shaft in a second direction along the longitudinal axis toward the threaded nut via the rotating of the threaded shaft in the first rotational direction while blocking the rotating of the annular ratchet in the first rotational direction via the contact between the annular ratchet and the threaded nut.

2. The method of claim 1, comprising sliding a pin that extends from the threaded shaft from a first end of a track formed in the annular ratchet to a second end of the track formed in the annular ratchet to move the annular ratchet along the threaded shaft in the second direction along the longitudinal axis toward the threaded nut.

3. The method of claim 1, comprising rotating the threaded shaft and the annular ratchet in a second rotational direction to break the contact between the annular ratchet and the threaded nut.

4. The method of claim 1, wherein the threaded nut comprises a first circumferentially-facing surface, the annular ratchet comprises a second circumferentially-facing surface, and the first and second circumferentially-facing surfaces are configured to contact one another to enable the threaded nut to block rotation of the annular ratchet with the threaded shaft.

5. The method of claim 4, wherein the first and second circumferentially-facing surfaces are oppositely inclined along a longitudinal axis.

6. The method of claim 4, wherein the threaded nut comprises a first longitudinally-facing surface and the annular ratchet comprises a second longitudinally-facing surface, and the first and second longitudinally-facing surfaces are separated from one another along a longitudinal axis while the pin contacts the first respective end portion of the one or more tracks and while the pin contacts the second respective end portion of the one or more tracks.

7. The method of claim 1, further comprising biasing the annular ratchet away from the threaded nut.

8. The method of claim 1, wherein the threaded shaft is configured to couple to a valve.

9. The method of claim 1, wherein the threaded nut comprises one or more radially-expanded tabs that are configured to engage an assembly housing to block rotation of the threaded nut relative to the assembly housing.

10. The method of claim 1, comprising extending a pin from the threaded shaft into one or more tracks formed in the annular ratchet.

11. The method of claim 10, wherein the threaded nut comprises a first circumferentially-facing surface, the annular ratchet comprises a second circumferentially-facing surface, and the first and second circumferentially-facing surfaces are configured to contact one another to enable the threaded nut to block rotation of the annular ratchet with the threaded shaft.

12. The method of claim 11, wherein the first and second circumferentially-facing surfaces are oppositely inclined along a longitudinal axis.

13. The method of claim 11, wherein the pin is configured to move from a first respective end portion of the one or more tracks to a second respective end portion of the one or more tracks.

14. The method of claim 13, wherein the first respective end portion and the second respective end portion are positioned at different locations along a longitudinal axis.

15. The method of claim 13, wherein the threaded nut comprises a first longitudinally-facing surface and the annular ratchet comprises a second longitudinally-facing surface, and the first and second longitudinally-facing surfaces are separated from one another along a longitudinal axis while the pin contacts the first respective end portion of the one or more tracks and while the pin contacts the second respective end portion of the one or more tracks.

* * * * *